United States Patent
Ahn et al.

(10) Patent No.: US 11,741,534 B2
(45) Date of Patent: Aug. 29, 2023

(54) OPERATING METHOD, ELECTRONIC APPARATUS, AND USER DEVICE FOR OFFERING ITEM INFORMATION AND ELECTRONIC APPARATUS SUPPORTING THEREOF

(71) Applicant: Coupang Corp., Seoul (KR)

(72) Inventors: Bo Hyun Ahn, Seoul (KR); Young Ju Choi, Seoul (KR); Hah Na Na, Seoul (KR); Seung Ho Jeong, Seoul (KR); Catherine Chang, Seoul (KR); Moon Hee Kim, Seoul (KR); Min Ji Yoon, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/407,598

(22) Filed: Aug. 20, 2021

(65) Prior Publication Data

US 2022/0343408 A1    Oct. 27, 2022

(30) Foreign Application Priority Data

Apr. 26, 2021   (KR) .......................... 10-2021-0053799

(51) Int. Cl.
  *G06Q 30/00* (2023.01)
  *G06Q 30/0601* (2023.01)
  *G06Q 30/0207* (2023.01)

(52) U.S. Cl.
  CPC ..... *G06Q 30/0643* (2013.01); *G06Q 30/0207* (2013.01); *G06Q 30/0625* (2013.01); *G06Q 30/0633* (2013.01)

(58) Field of Classification Search
  CPC ........... G06Q 30/0643; G06Q 30/0207; G06Q 30/0625; G06Q 30/0633
  (Continued)

(56) References Cited

U.S. PATENT DOCUMENTS 9,183,587 B1 * 11/2015 Rosner ............... G06Q 30/0641
10,438,266 B1 * 10/2019 Batra .................... H04L 67/025
(Continued)

FOREIGN PATENT DOCUMENTS

KR        101621095 B1    3/2011
KR    1020130139157 A    12/2013
(Continued)

OTHER PUBLICATIONS

Jannach, D., Ludewig, M., & Lerche, L. (2017). Session-based item recommendation in e-commerce: On short-term intents, reminders, trends and discounts. User Modeling and User-Adapted Interaction, 27(3-5), 351-392. doi:https://doi.org/10.1007/s11257-017-9194-1 (Year: 2017).*

*Primary Examiner* — Arielle E Weiner
(74) *Attorney, Agent, or Firm* — Banner & Witcoff, Ltd.

(57) ABSTRACT

Disclosed is a method of providing item information by an electronic apparatus, the method including confirming information on a first item on the basis of a first input including selection information of user acquired from a first page, confirming whether a second item having identification information corresponding to the first item is present on the basis of the information on the first item, and providing a second page having a first widget including unit price information of the first item and unit price information of the second item and a second widget including payment amount information, in response to a second input for item purchase, when the second item is present and the unit price information of the second item is lower than the unit price information of the first item.

13 Claims, 10 Drawing Sheets

(58) Field of Classification Search
USPC .......................................................... 705/27.2
See application file for complete search history.

(56) References Cited

U.S. PATENT DOCUMENTS

| | | | |
|---|---|---|---|
| 10,748,159 B1* | 8/2020 | Selinger | G06Q 30/02 |
| 11,151,608 B1* | 10/2021 | Guo | G06Q 30/0255 |
| 11,422,675 B1* | 8/2022 | Abdul Kadar | G06Q 30/0282 |
| 2011/0063510 A1 | 3/2011 | Lee et al. | |
| 2012/0284105 A1* | 11/2012 | Li | G06Q 30/02 705/14.23 |
| 2013/0268401 A1 | 10/2013 | Choi et al. | |
| 2013/0268410 A1 | 10/2013 | Finlaw | |
| 2013/0332228 A1* | 12/2013 | Lim | G06Q 30/0603 705/7.29 |
| 2015/0066586 A1* | 3/2015 | Teraoka | G06Q 30/0201 705/7.29 |
| 2015/0294387 A1* | 10/2015 | Karmazyn | G06Q 30/0641 705/26.61 |
| 2017/0337542 A1 | 11/2017 | Kim et al. | |
| 2018/0150869 A1* | 5/2018 | Finnegan | G06Q 30/0239 |
| 2020/0074402 A1* | 3/2020 | Adato | G06Q 10/06315 |
| 2021/0049514 A1* | 2/2021 | Neumann | G06K 9/6267 |

FOREIGN PATENT DOCUMENTS

| | | |
|---|---|---|
| KR | 101500849 B1 | 3/2015 |
| KR | 1020160058323 A | 5/2016 |
| KR | 1020160064304 A | 6/2016 |
| KR | 102019976 B1 | 2/2017 |
| KR | 1020170019976 A | 2/2017 |
| KR | 101756594 B1 | 7/2017 |
| KR | 1020170090178 A | 8/2017 |
| KR | 101806169 B1 | 12/2017 |
| KR | 10-2019967 B1 | 9/2019 |
| WO | 2017078365 A1 | 5/2017 |

* cited by examiner

OPERATING METHOD, ELECTRONIC APPARATUS, AND USER DEVICE FOR OFFERING ITEM INFORMATION AND ELECTRONIC APPARATUS SUPPORTING THEREOF

RELATED APPLICATION INFORMATION

The present application claims priority to and the benefit of Korean Patent Application No. 10-2021-0053799 filed on Apr. 26, 2021, and is incorporated by reference herein in its entirety.

TECHNICAL FIELD

The following descriptions relate to a method and apparatus for providing item information and, more particularly, to a method of providing a page having a widget including item-related information and an electronic apparatus thereof.

DESCRIPTION OF THE RELATED ART

With the development of electronic technology, e-commerce has become a field of shopping. Customers can purchase products online without going to shopping malls or markets in person, and a product purchased online is delivered to the customer's requested delivery address.

In the case of e-commerce, since the provision of detailed and accurate information on products has a significant impact on service satisfaction, discussions have been made on various ways to provide more detailed and accurate information.

In this regard, related documents such as KR101756594B1 or KR101500849B1 may be referred to.

DISCLOSURE OF THE INVENTION

Technical Goals

According to a method of the present disclosure, an electronic apparatus for providing item information may provide a page having a plurality of widgets including item-related information, thereby facilitating purchase convenience for users.

Technical goals intended to be achieved by the disclosure are not limited to the aforementioned goals, and other technical goals that are not described herein should be clearly understood by those skilled in the art from the following description.

Technical Solutions

Various example embodiments may provide an operating method for an electronic apparatus for providing item information and an electronic apparatus for supporting the same.

According to various example embodiments, there is provided a method of providing item information by an electronic apparatus, the method including confirming information on a first item on the basis of a first input including selection information of user acquired from a first page, confirming whether a second item having identification information corresponding to the first item is present on the basis of the information on the first item, and providing a second page having a first widget including unit price information of the first item and unit price information of the second item and a second widget including payment amount information, in response to a second input for item purchase, when the second item is present and the unit price information of the second item is lower than the unit price information of the first item.

In an example embodiment, the identification information may be determined based on an item type.

In an example embodiment, the method may further include displaying the payment amount information being changed to a price associated with the second item, in response to a third input for selecting the second item through the first widget.

In an example embodiment, the method may further include providing a third page for payment in response to a fourth input acquired through the second page.

In an example embodiment, the second page may have the first widget, the second widget, and one or more other widgets, and the one or more other widgets may be displayed on the second page in an order determined based on the number of times a plurality of different users select each of the one or more other widgets.

In an example embodiment, the second page may further have a third widget including information on an item confirmed according to purchase history of the user.

In an example embodiment, the second page may further have a fourth widget including information on an item confirmed according to purchase history of another user related to the first item.

In an example embodiment, the second page may further have a fifth widget including information on an item confirmed correspondingly according to a time point that the second input is acquired.

In an example embodiment, the second page may further have a sixth widget including information on an item that a price discount is applied.

In an example embodiment, the second page may further have a seventh widget including information on an item associated with the first item.

In an example embodiment, an item displayed on the seventh widget may be changed based on a fifth input corresponding to the seventh widget.

In an example embodiment, the second page may further have an eighth widget including information on a separate item list designated by the user.

In an example embodiment, the second widget may be displayed at a fixed location regardless of scrolling of the user in the second page.

In an example embodiment, the payment amount information included in the second widget may include a price to which a discount is applied based on information of the user and the information on the first item.

In an example embodiment, the information on the first item may include information on one or more price benefit types for the first item, the information on the one or more price benefit types may be configured as a table including the one or more price benefit types, and the discounted amount may be determined based on whether one or more price benefits are applied to the user.

According to various example embodiments, there is provided an electronic apparatus for providing item information, the electronic apparatus including a processor and one or more memories configured to store one or more instructions. When executed, the one or more instructions may control the processor to perform operations of confirming information on a first item on the basis of a first input including selection information of user acquired from a first page, confirming whether a second item having identification information corresponding to the first item is present on the basis of the information on the first item, and providing a second page having a first widget including unit price information of the first item and unit price information of the second item and a second widget including payment amount information, in response to a second input for item purchase, when the second item is present and the unit price information of the second item is lower than the unit price information of the first item.

According to various example embodiments, there is provided a user device for outputting item information, the user device including a processor and one or more memories configured to store one or more instructions. When executed, the one or more instructions may control the processor to perform operations of transmitting, to a server device, a first input including selection information of user acquired from a first page, receiving, from the server device, information on a first item on the basis of the first input, receiving, from the server device, a second page having a first widget including unit price information of the first item and unit price information of a second item and a second widget including payment amount information in response to a second input for item purchase when the second item having identification information corresponding to the first item is present and the unit price information of the second item is lower than the unit price information of the first item, and outputting the second page.

The above-described various example embodiments of the present disclosure are only some of the exemplary example embodiments of the present disclosure, and several example embodiments reflecting the technical characteristics of the various example embodiments of the present disclosure can be derived and understood by those skilled in the art on the basis of the detailed description to be described below.

Effects

The present disclosure provides a method of providing a page having a plurality of widgets including various pieces of information related to items to be purchased by users and thus has a technical effect in terms of facilitating purchase convenience for users.

Effects of the disclosure are not limited to the aforementioned effects, and other effects that are not described herein should be clearly understood by those skilled in the art from the following description.

BRIEF DESCRIPTION OF THE DRAWINGS

FIG. 7 is a diagram showing another example in which the user device 200 outputs a page including a widget to a user according to various example embodiments.

FIGS. 9A and 9B are diagrams showing an example in which the user device 200 outputs a page including various widgets described in example embodiments of FIGS. 4 to 8B to a user in a comprehensive way according to various example embodiments.

DETAILED DESCRIPTION FOR CARRYING OUT THE INVENTION

The following example embodiments are combinations of elements and features of various example embodiments in specific forms. Each element or feature may be considered as optional unless explicitly stated otherwise. Each element or feature may be embodied without being combined with other elements or features. Also, various example embodiments may be configured by combining some elements and features. The order of operations described in various example embodiments may be changed. Some elements or features in any example embodiment may be included in other example embodiments or may be replaced with elements or features corresponding to other example embodiments.

In the description of the drawings, procedures or operations that may obscure the subject matter of various example embodiments are not described, and procedures or operations that are understandable by those skilled in the art are also not described.

Throughout the specification, when a part is referred to as "comprising" or "including" some elements, this means that other elements may be further included rather than excluded unless otherwise specified. Also, terms such as "-er," "-or," and "module" used herein refer to an element for performing at least one function or operation and may be implemented with hardware, software, or a combination thereof. Also, the use of the term "a," "an," "one," and "the" and similar referents in the context of describing the disclosure (especially in the context of the following claims) are to be construed to cover both the singular and the plural, unless otherwise indicated herein or clearly contradicted by context.

Hereinafter, various example embodiments will be described in detail with reference to the accompanying drawings. The detailed description to be disclosed below with the accompanying drawings is intended to describe various example embodiments and is not intended to represent the only example embodiment.

Also, specific terms used in various example embodiments are provided to aid understanding of the various example embodiments, and the use of these specific terms may be changed in other forms without departing from the technical spirit of the various example embodiments.

Figure 1:
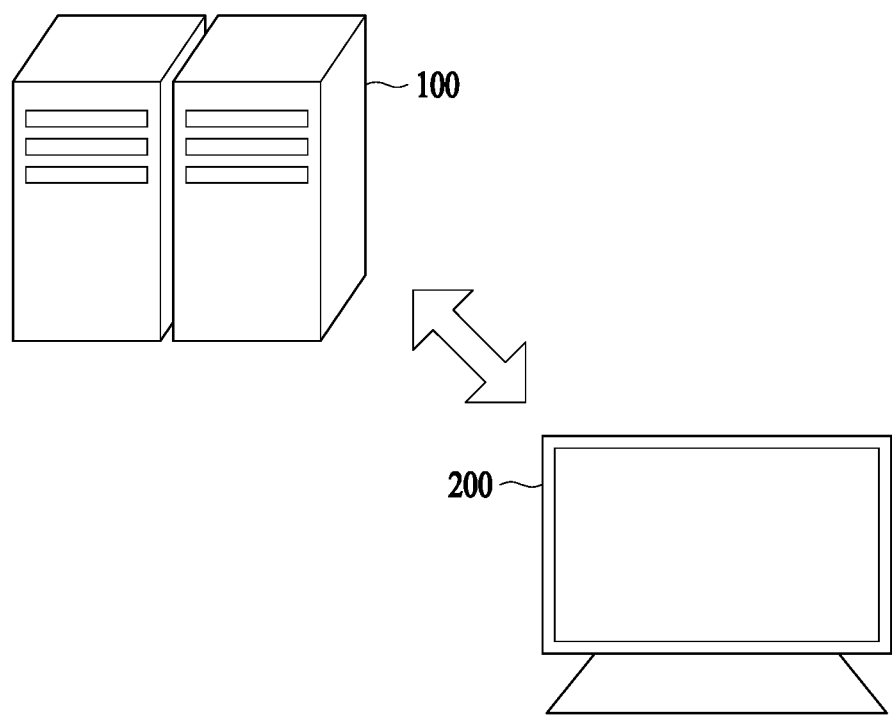
FIG. 1 is a diagram illustrating an item information provision system in which an operating method for an electronic apparatus for providing item information may be implemented according to various example embodiments.

FIG. 1 is a diagram illustrating an item information provision system in which an operating method for an electronic apparatus for providing item information may be implemented according to various example embodiments.

Referring to FIG. 1, the item information provision system according to various example embodiments may be implemented in various types of electronic apparatuses. For example, the item information provision system may be implemented in a server device 100 and a user device 200. In other words, the server device 100 and the user device 200 may perform operations corresponding to various example embodiments of the present disclosure on the basis of the item information provision systems implemented therein. Meanwhile, the item information provision system according to various example embodiments is not limited to that shown in FIG. 1 and may be implemented in more various electronic apparatuses and servers.

The server device 100 according to various example embodiments may be an apparatus that performs wireless and wired communication with a plurality of user devices 200 and includes a storage device with large storage capacity. For example, the server device 100 may be a cloud device interworking with a plurality of user devices.

The user device 200 according to various example embodiments may be an apparatus that may be used by individual users, such as a desktop PC, a tablet PC, and a mobile terminal. In addition, other electronic apparatuses that perform similar functions may be used as the user device 200.

The item information provision system according to various example embodiments may include various modules for operating. Modules included in the item information provision system may be one or more instructions or computer code that is implemented such that a physical device (e.g., the server device 100 and the user device 200) in which the item information provision system is implemented (or which is included in the physical device) may perform a designated operation. In other words, a physical device in which the item information provision system is implemented stores a plurality of modules in a memory in the form of computer code, and when the plurality of modules stored in the memory are executed, the plurality of modules may enable the physical device to perform designated operations corresponding to the plurality of modules.

Figure 2:
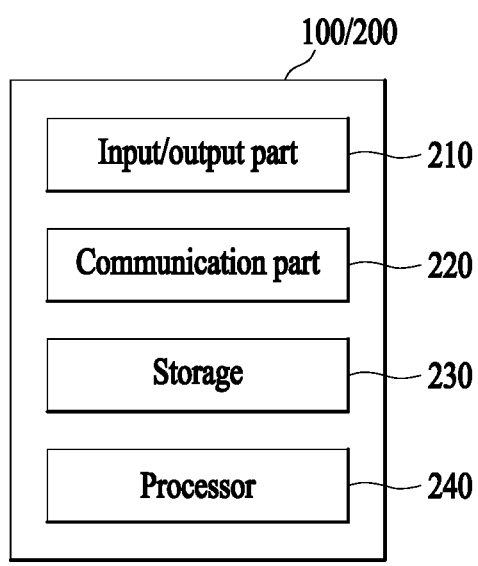
FIG. 2 is a diagram showing components of a server device and a user device according to various example embodiments.

FIG. 2 is a diagram showing elements of a server device and a user device according to various example embodiments.

Referring to FIG. 2, each of the server device 100 and the user device 200 may include an input/output part 210, a communication part 220, a storage device 230, and a processor 240.

The input/output part 210 may include various kinds of interfaces, connection ports, or the like, which receive a user input or which outputs information to a user. The input/output part 210 may include an input module and an output module, and the input module receives a user input from a user. The user input may be formed in various forms, including a key input, a touch input, and a voice input. Examples of an input module that may receive such a user input may include a touch sensor configured to detect a user's touch, a microphone configured to receive a voice signal, a camera configured to recognize a gesture or the like through image recognition, a proximity sensor including at least one of an illumination sensor or an infrared sensor for detecting a user's approach, a motion sensor configured to recognize a user's motion through an acceleration sensor, a gyro sensor, or the like, and various other input parts configured to detect or receive various user inputs as well as a typical keypad, keyboard, or mouse. The input module according to an example embodiment of the present disclosure may include at least one of the above-listed devices. Here, the touch sensor may be implemented as a piezoelectric or capacitive touch sensor that senses a touch through a touch panel or a touch film attached to a display panel, an optical touch sensor that senses a touch by an optical method, and the like. In addition, the input module may be implemented in the form of an input interface (a Universal Serial Bus (USB) port, a PS/2 port, etc.) configured to connect an external input device receiving a user input instead of a device that senses a user input by itself. Also, the output module may output various kinds of information. The output module may include at least one of a display configured to output images, a speaker configured to output sounds, a haptic device configured to generate vibration, and various other types of output means. In addition, the output module may be implemented in the form of a port-type output interface configured to connect the above-described individual output means.

As an example, the display-type output module may display text, still images, and videos. The display may include a liquid crystal display (LCD), a light-emitting diode (LED) display, an organic light-emitting diode (OLED) display, a flat panel display (FPD), and a transparent display, a curved display, a flexible display, a 3D display, a holographic display, a projector, and various other types of devices capable of performing an image output function. Such a display may be in the form of a touch display integrated with a touch sensor of the input module.

The communication part 220 may communicate with other apparatuses. Therefore, the server device 100 and the user device 200 may transmit and receive information to and from other apparatuses through communication parts. For example, the server device 100 and the user device 200 may communicate with each other or communicate with other apparatuses using communication parts.

Here, communication, i.e., transmission and reception of data may be performed in a wired or wireless manner. To this end, the communication part is a wired communication module that accesses the Internet through a local area network (LAN), a mobile communication module that accesses a mobile communication network through a mobile communication base station to transmit and receive data, a short-range communication module that uses a communication scheme based on a wireless local area network (WLAN) such as WiFi or a communication scheme based on a wireless personal area network (WPAN) such as Bluetooth and Zigbee, a satellite communication module that uses a Global Navigation Satellite System (GNSS) such as GPS Global Positioning System (GPS), or a combination thereof.

The storage device 230 may store various kinds of information. The storage device may temporarily or semi-permanently store data. For example, an operating system (OS) for driving the server 100, data for hosting websites, data for programs or applications (e.g., web applications) for generating data or Braille, and the like may be stored in the storage device of the server 100. Also, the storage device may store modules as described above in the form of computer code.

Examples of the storage device 230 may include a hard disk drive (HDD), a solid-state drive (SSD), a flash memory, a read-only memory (ROM), a random access memory (RAM), etc. Such a storage device may be provided as a built-in type or a detachable type.

The processor 240 controls the overall operation of the server device 100 and the user device 200. To this end, the processor 240 may compute and process various kinds of information and may control the operation of the elements of the server 100. For example, the processor 240 may execute a program or application for providing item information. The processor 240 may be implemented with a computer or the like according to hardware, software, or a combination thereof. The processor 240 in hardware may be implemented in the form of an electronic circuit for processing electrical signals to perform a control function, and the processor 240 in software may be implemented in the form of a program for running the processor 240 in hardware. In the following description, unless otherwise specified, the operation of the server device 100 and the user device 200 may be interpreted as being performed by control of the processor 240. That is, when modules implemented in the above-described item information provision system are executed, the modules may be interpreted as enabling the processor 240 to control the server device 100 and the user device 200 to perform the following operations.

In summary, various example embodiments may be implemented through various means. For example, various example embodiments may be implemented by hardware, firmware, software, or a combination thereof.

In the case of hardware implementation, a method according to various example embodiments may be implemented by one or more application-specific integrated circuits (ASICs), digital signal processors (DSPs), digital signal processing devices (DSPDs), programmable logic devices (PLDs), field-programmable gate arrays (FPGAs), processors, controllers, microcontrollers, microprocessors, and the like.

In the case of firmware or software implementation, a method according to various example embodiments may be implemented in the form of a module, procedure, function, or the like that performs the following-described functions or operations. For example, software code may be stored in a memory and executed by a processor. The memory may be placed inside or outside the processor and may send and receive data to and from the processor through various known means.

Hereinafter, various example embodiments will be described in more detail based on the above technical spirit. The above-described contents may be applied to the various example embodiments described below. For example, operations, functions, terms, etc. that are not defined in various example embodiments described below may be performed and described based on the above-described contents.

In the following description, various example embodiments will be described on the premise that the server device 100 performs an operation of providing item information. According to various example embodiments, when acquiring the item information from the server device 100, the user device 200 may output the item information.

Figure 3:
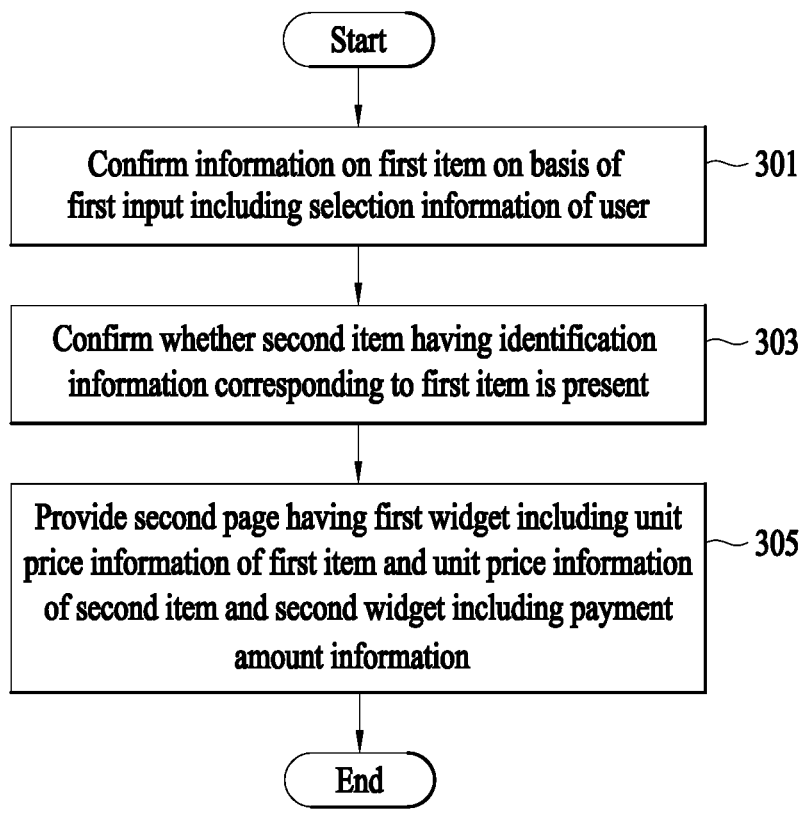
FIG. 3 is a diagram showing an operating method for an electronic apparatus for providing item information according to various example embodiments.

FIG. 3 is a diagram showing an operating method for an electronic apparatus for providing item information according to various example embodiments.

According to various example embodiments, in operation 301, the server device 100 may confirm information on a first item on the basis of a first input including user selection information acquired from a first page. As an example, the server device 100 may confirm information on a first item that a user wants to purchase through a user input.

For example, the first input including the user selection information may be received through the user device 200 and delivered to the server device 100.

For example, the first input including the user selection information may be a user input for a procedure for confirming the information on the first item.

For example, the first page may be a page that provides information on a single detail page (SDP) for confirming the information on the first item, or the first page may be a page that provides information on a user's purchase schedule list including the first item and allows information on the first item to be confirmed. That is, the first page may correspond to a page for confirming the information on the first item in a procedure for purchasing the first item.

For example, the information on the first item may include information related to characteristics of the first item, and the information related to the characteristics of the first item may include a plurality of pieces of information regarding item purchase characteristics such as the name, image, usage, or price of the corresponding first item. Also, when the first item is an item that allows a different unit price to be determined depending on capacity or quantity, the information on the first item may also include information on the unit price of the first item.

For example, the information on the first item may include information on a price benefit type to be applied to the first item. Here, the price benefit type to be applied to the first item may include 1) a type in which a user receives a discount on the sales price through a discount coupon provided by a seller who sells the first item or a business operator who provides a certain service through an electronic apparatus in relation to the sale of the first item and 2) a type in which a user receives a discount on the sales price according to a user's payment method for purchasing the first item. Also, the price benefit type to be applied to the first item may include 3) a type in which a user receives a benefit of an interest-free installment period according to a user's payment method for purchasing the first item and 4) a type in which a user receives a benefit by receiving a portion of the purchase amount in the form of refund such as a cashback reward. That is, the information on the first item may include information on one or more price benefit types for the first item.

In this case, the one or more price benefit types included in the information on the first item may be benefit types that are individually applied to the first item or may be benefit types that are individually applied to a user who wants to purchase the first item. The service device 100 may acquire and confirm information on the user and the information on the first item in order to determine a price benefit type applicable to the first item or users.

Also, information on the one or more price benefit types may be configured in the form of a table that provides the above-described information on the one or more price benefit types in corresponding rows. That is, one table with rows that provide information on the price benefit types 1) to 4) may be provided as the information on the one or more price benefit types. A user may confirm the details of a price benefit type applicable to the user by clicking on a row that provides information on the price benefit type in the table. As an example, there may be a price benefit type in which a discount coupon of KRW 10,000 is provided for the first item and a price benefit type in which a user can sign up for membership for a service provided through an electronic apparatus and receive a cashback reward according to a membership benefit. In this case, the information on the first item includes information on the above two price benefit types for the first item, and the information on the price benefit types may be configured in the form of a table including a row that provides information on a price benefit type in which a discount coupon is provided and a row that provides information on a price benefit type in which a cashback reward can be received and may be displayed through the user device 200. When there are a plurality of price benefits corresponding to one price benefit type, the plurality of price benefits may be included in a row that provides information on the price benefit type and may be specifically provided when a user clicks on the row. Through the method, the server device 100 and the user device 200 may provide and display information related to more price benefits in a smaller area.

Here, the variety of information related to the above-described price benefit types is not limited to the above-described phrase or text content and may include other phrases or various other content that may indicate information related to price benefits for items.

For example, the information on the first item may include identification information for identifying the type of the first item. The identification information is an item identifier or a product identifier and is assigned based on an item type in order to distinguish items from each other. The same identification information may be assigned to items of the same type in a service managed by the server device 100 regardless of sellers who sell the items. Here, each identifier may be referred to as identification information in the present specification.

According to various example embodiments, in operation 303, the server device 100 may check whether there is a second item having identification information corresponding to the first item on the basis of the confirmed information on the first item.

For example, the second item having the identification information corresponding to the first item may be an item having an item identifier corresponding to the first item, and the second item may be an item of the same type which has specific-attribute-related identification information corresponding to the first item. Information on one item may include identification information indicating a plurality of pieces of information, and the first item and the second item may be specific-attribute-related items corresponding to each other. As an example, the first item and the second item may be the same product but may be different in quantity. In this case, an identifier indicating the product type of the first item may correspond to an identifier indicating the product type of the second item.

For example, the operation in which the server device 100 checks whether there is a second item in operation 303 may include an operation of checking whether an item having identification information corresponding to the first item is for sale through a service managed by the server device 100 or a service provided by the electronic apparatus.

For example, the operation in which the server device 100 checks whether there is a second item in operation 303 may include an operation of confirming information on the second item when the second item is present. That is, when the second item having the identification information corresponding to the first item is present, the server device 100 may confirm that the second item is present and also confirm information on the second item.

The information on the second item confirmed by the server device 100 may include information related to characteristics of the second item, and the information related to the characteristics of the second item may include a plurality of pieces of information regarding item purchase characteristics such as the name, image, usage, or price of the corresponding second item. Also, when the second item is an item that allows a different unit price to be determined depending on capacity or quantity, the information on the second item may also include information on the unit price of the second item.

According to various example embodiments, in operation 305, the server device 100 may provide a second page having a first widget including unit price information of the first item and unit price information of the second item and a second widget including payment amount information. Here, a widget, which is a region for displaying information in a specific page, may include a region that represents the information. In some example embodiments, optionally, a widget may include a borderline for distinguishing a widget region from an external region.

For example, the second page may be a page that is provided in response to an input for a user to purchase an item or an input for a user to add an item to a purchase schedule list. That is, when an additional input for purchasing the first item is acquired by a user who receives the information on the first item through the first page, the server device 100 may provide a second page corresponding to operation 305.

For example, the second page may be a page that is additionally provided during a process for a user to purchase the first item before a payment page is provided. That is, the second page may be a page that is separately provided to a user upon the acquirement of a user's input for an item purchase before a payment page corresponding to the user's input is provided.

For example, the unit price information of the first item and the unit price information of the second item included in the first widget provided on the second page may be configured in the same format and provided as information for comparing unit prices for items.

For example, the payment amount information included in the second widget provided on the second page may include an amount to be paid by a user to purchase an item when the item to be purchased by the user is subject to a certain price discount and may also include information indicating that the corresponding amount is discounted.

For example, a user's input for selecting an item on the second page may be additionally acquired. That is, the first widget provided on the second page may include the unit price information of the first item and the unit price information of the second item, and the user may evaluate the unit price information and provide an input for selecting which of the first item and the second item to purchase to the first widget. Also, price amount payment information included in the second widget may be determined according to the item selected in the first widget.

At this time, the second page provided by the server device 100 is originally provided in response to a user's additional input for purchasing the first item. Thus, when the user does not provide an input for selecting which of the first item and the second item to purchase, the server device 100 may set the first widget in which the first item is selected as a default state, and the payment amount information included in the second widget may include information regarding an amount determined based on a price associated with the first item. That is, in the first widget provided on the second page, the first item is selected by default, but when the user's input for selecting the second item is provided to the first widget, the item to be purchased by the user may be changed from the first item to the second item, and the second widget may be changed to include information on an amount determined based on a price associated with the second item.

For example, a user's input for an item purchase on the second page may be additionally acquired. The user's input for an item purchase may be an input that is provided for the second widget by the user to purchase an item selected from the first widget according to an input provided by the user. The server device 100 may provide a page for payment for an item selected in response to the user's input for purchasing the selected item.

In operation 305, the server device 100 may provide a second page having one or more other widgets including information corresponding to the following example embodiments.

For example, the one or more other widgets may be widgets including different information from the first widget and the second widget provided by the server device 100 in operation 305.

For example, the second page may have the first widget, the second widget, and one or more other widgets, and locations in which the widgets are displayed on the second page may vary depending on the settings of the server device 100 or users' clicks on the widgets. Specifically, the one or more other widgets on the second page may be sequentially displayed from top to down, and the first widget may be displayed below the one or more other widgets. In this case, the one or more other widgets that are sequentially displayed from top to down may be displayed on the second page in an order determined according to the numbers of clicks of a plurality of users on the one or more other widgets. That is, according to each example embodiment, the display order of the plurality of widgets may be determined based on the number of times other users select each widget, and the display order may be determined based on the total amount of or the number of products purchased through a corresponding widget. Also, the second widget that includes the payment amount information and is for receiving a user's input for an item purchase may be fixedly displayed at a specific location regardless of scrolling of the user in the second page. That is, the second widget may be fixedly displayed on a lower portion of a screen of the user device 200 that outputs the second page regardless of the user's scrolling.

For example, the second page may have a third widget including information on an item recommended or confirmed according to a user's purchase history. At this time, the item recommended or confirmed according to purchase history of the user may be an item that the user has purchased a certain number of times or more, and information on the corresponding item may be displayed on the third widget as text such as "frequently purchased product." The certain number of times, which is a criterion of the purchase history for recommendation or confirmation, may be a preset number and may be counted by determining whether the same item is repeatedly purchased on the basis of an item identifier. As an example, the number of times the user purchases the item may be counted for a specific period of time, and the specific period may be a preset period such as one month, one quarter, one half, or one year.

Here, as described above, an item that satisfies purchase history of the user may be an item that may be recommended or confirmed through the third widget in consideration of the following points. Specifically, 1) the item recommended or confirmed through the third widget may be an item that needs to be kept fresh or up-to-date and corresponds to a specific delivery type related to a service provided by an electronic apparatus, and 2) when an item is not in stock, the item may be excluded from recommendation or confirmation through the third widget. Also, 3) when the user has already added, to the purchase schedule list, an item that needs to be kept fresh or up-to-date and corresponds to a specific delivery type related to a service provided by the electronic apparatus, an item having the same purchase state information, identification information, or category information as the corresponding item may be excluded from recommendation or confirmation through the third widget. In addition, 4) an item that is recently purchased by the user may be excluded from recommendation or confirmation through the third widget. As an example, the server device 100 may not recommend or confirm an item within 5 days of purchase by the user through the third widget.

For example, the second page may have a fourth widget including information on an item recommended or confirmed according to purchase history of another user related to the first item. When the first item corresponds to a specific type, the item recommended or confirmed according to the other user's purchase history related to the first item may be an item that other users have purchased a certain number of times or more in relation to the corresponding specific type.

As an example, when an item to be purchased by a user corresponds to a meat item type, the server device 100 may recommend or confirm an item that other users have purchased a certain number of times or more in relation to the meat item type through the fourth widget. An item that may be recommended or confirmed through the fourth widget in relation to the meat item type may include various meat items such as chicken, beef sirloin or tenderloin, pork neck, etc.

Here, as described above, an item that satisfies other users' purchase histories in relation to a specific type may be an item that may be recommended or confirmed through the fourth widget in consideration of the following points. Specifically, 1) when an item is not in stock or the price of an item exceeds a certain price, the item may be excluded from recommendation or confirmation through the fourth widget, and 2) even when an item does not satisfy a certain number of reviews or more or a certain score or more, the item may be excluded from recommendation or confirmation through the fourth widget.

For example, the second page may have a fifth widget including information on an item recommended or confirmed according to when a user's input related to the purchase of the first item is acquired by the server device 100. The item recommended or confirmed according to when a user's input related to the purchase of the first item is acquired by the server device 100 may be an item having seasonality or a seasonal item, which is in season, on the basis of when the first item is purchased by the user, and information on the corresponding item may be displayed on the fifth widget as text such as "seasonal product." The item having seasonality or the seasonal item, which is in season, that may be recommended or confirmed through the fifth widget may include various seasonal items such as seafood, fruits, or vegetables that vary depending on the season, for example, oysters, shrimps, apples, strawberries, or Chinese cabbage. Meanwhile, in this example embodiment, the seasonal product may be determined based on when the user purchases the item or may be determined based on whether sufficient inventory has been acquired in a service operated by the server device 100. Therefore, in order to display a seasonal product, the server device 100 may confirm inventory information on a specific item and may determine an item corresponding to the seasonal product on the basis of the inventory information.

Here, as described above, the item having seasonality or the seasonal item, which is in season, may be an item that may be recommended or confirmed through the fifth widget in consideration of the following points. Specifically, 1) similar to the above, when an item is not in stock, the item may be excluded from recommendation or confirmation through the fifth widget, and 2) when an item has seasonality or is in season but can be kept frozen or does not need freshness to be maintained, the item may be excluded from recommendation or confirmation through the fifth widget.

For example, the second page may have a sixth widget including information on an item recommended or confirmed at a discounted price. The item recommended or confirmed at a discounted price may be an item to which a price discount event or promotion is applied for a certain period of time on the basis of when the first time is purchased by the user, and information on the corresponding item may be displayed on the sixth widget as text such as "special price product." At this time, in some cases, text indicating that the recommended or confirmed item is more suitable for the user, such as "preferred category" or "recommended as additional purchase," may be additionally displayed for the item recommended or confirmed through the sixth widget.

Here, as described above, an item subject to a price discount may be an item that may be recommended or confirmed through the sixth widget in consideration of the following points. Specifically, 1) when an item is not in stock, the item may be excluded from recommendation or confirmation through the sixth widget, and 2) when an item has a long remaining period of the price discount event or promotion on the basis of when the first item is purchased by the user, the item may also be excluded from recommendation or confirmation through the sixth widget. As an example, when an item has a remaining period of one week or more remaining for a price discount event or promotion on the basis of when the first item is purchased by the user, the server device 100 may not recommend or confirm the item through the sixth widget.

For example, the second page may have a seventh widget including information on an item associated with the first item to be purchased by the user. The item associated with the first item to be purchased by the user may be an item recommended or confirmed as a product suitable for being purchased together with the first item on the basis of the characteristics of the first item to be purchased by the user, and information on the corresponding item may be displayed on the seventh widget as text such as "product suitable for also being purchased." Here, the item recommended or confirmed as a product suitable for being purchased together with the first item may be an item that belongs to a category with a high frequency of purchases along with a category to which the first item belongs. In this case, when the category with the high frequency includes a plurality of categories, the category for the recommended or confirmed item may be determined in consideration of a user's interest and purchase rate for the corresponding category, and an item belonging to a category with high interest and a low purchase rate may be set to be preferentially recommended or confirmed.

Here, as described above, the item that may be recommended or confirmed as a product suitable for being purchased together with the first item may be an item that may be recommended or confirmed through the seventh widget in consideration of the following points. Specifically, 1) the item recommended or confirmed through the seventh widget may be an item that needs to be kept fresh or up-to-date and corresponds to a specific delivery type related to a service provided by an electronic apparatus, and 2) when an item is not in stock, the item may be excluded from recommendation or confirmation through the seventh widget. Also, 3) when the user has already added, to the purchase schedule list, an item that needs to be kept fresh or up-to-date and corresponds to a specific delivery type related to a service provided by the electronic apparatus, an item having the same purchase state information, identification information, or category information as the corresponding item may be excluded from recommendation or confirmation through the seventh widget. In addition, 4) even when an item belongs to a category with a high frequency of purchases along with the category to which the first item belongs, the item may be excluded from recommendation or confirmation through the seventh widget when the category has just a high frequency of purchases but has little or no association with the category of the first item.

In this case, the seventh widget provided on the second page may acquire a user's input for recommending or confirming an item associated with the first item other than the item recommended or confirmed through the seventh widget. When the user's input is acquired, the item recommended or confirmed through the seventh widget may be changed and then displayed.

For example, the second page may include an eighth widget including information on a separate item list designated by the user. The separate item list designated by the user may include an item that is separately added to the purchase schedule list by the user to purchase the item or may include an item for which a stock situation is requested by the user to purchase the item and for which information on the corresponding stock situation is confirmed. Information on the corresponding item may be displayed through the eighth widget as text such as "wish list product" or "product requested for restocking notification."

Here, as described above, the item that is separately added to the purchase schedule list to purchase the item may be an item that may be recommended or confirmed through the eighth widget in consideration of the following points. Specifically, 1) the item recommended or confirmed through the eighth widget may be an item that needs to be kept fresh or up-to-date and corresponds to a specific delivery type related to a service provided by an electronic apparatus, and 2) when an item is not in stock, the item may be excluded from recommendation or confirmation through the eighth widget. Also, 3) when the user has already added, to the purchase schedule list, an item that needs to be kept fresh or up-to-date and corresponds to a specific delivery type related to a service provided by the electronic apparatus, an item having the same purchase state information, identification information, or category information as the corresponding item may be excluded from recommendation or confirmation through the eighth widget. In addition, 4) an item that is recently purchased by the user may be excluded from recommendation or confirmation through the eighth widget.

Alternatively, as described above, the item for which a stock situation is requested by the user so that the item can be purchased and for which information on the corresponding stock situation is confirmed may be an item that may be recommended or confirmed through the eighth widget in consideration of the following points. Specifically, 1) even when a target item is not in the purchase schedule list while the user has requested a stock situation for the target item, the target item may be recommended or confirmed through the eighth widget when the target item is in stock on the basis of when the first item is purchased, and 2) the item that is recently confirmed or purchased by the user may be excluded from recommendation or confirmation through the eighth widget.

For example, 1) when an item to be purchased by the user is an item that needs to be kept fresh or up-to-date and corresponds to a specific delivery type related to a service provided by an electronic apparatus, the one or more other widgets may include an item recommended or confirmed based on the category of the item to be purchased by the user and a delivery service for the item. Alternatively, 2) when at least one of a plurality of items to be purchased by the user is an item that needs to be kept fresh or up-to-date and corresponds to a specific delivery type related to a service provided by an electronic apparatus, the one or more other widgets may include an item recommended or confirmed based on the category of the at least one item and a delivery service for the at least one item. Also, in the case of 2), according to the settings of the server device 100, the one or more other widgets may include an item recommended or confirmed based on the category of an item other than the at least one of the plurality of items to be purchased by the user and a delivery service for the corresponding other item.

FIGS. 4 to 10 are diagrams showing examples of a user interface (Up/user experience (UX)) for providing item information according to various example embodiments. For example, the examples of FIGS. 4 to 10 may be a UI/UX for the user device 200. Each of the example embodiments described in the following drawings may be achieved based on the operation of the server device 100 described above in FIG. 3.

Specifically, in each of the example embodiments of the UI/UX for the user device 200 described in the following drawings, when the user device 200 receives input information from the user and transmits the input information to the server device 100, the server device 100 may provide information corresponding to the input information to the user device 200 on the basis of the operations described above with reference to FIG. 3, and then the user device 200 may output the information. However, each example embodiment of the UI/UX described in the following drawings is not limited to such a form and may be achieved with any form capable of implementing each example embodiment of the UI/UX.

Figure 4:
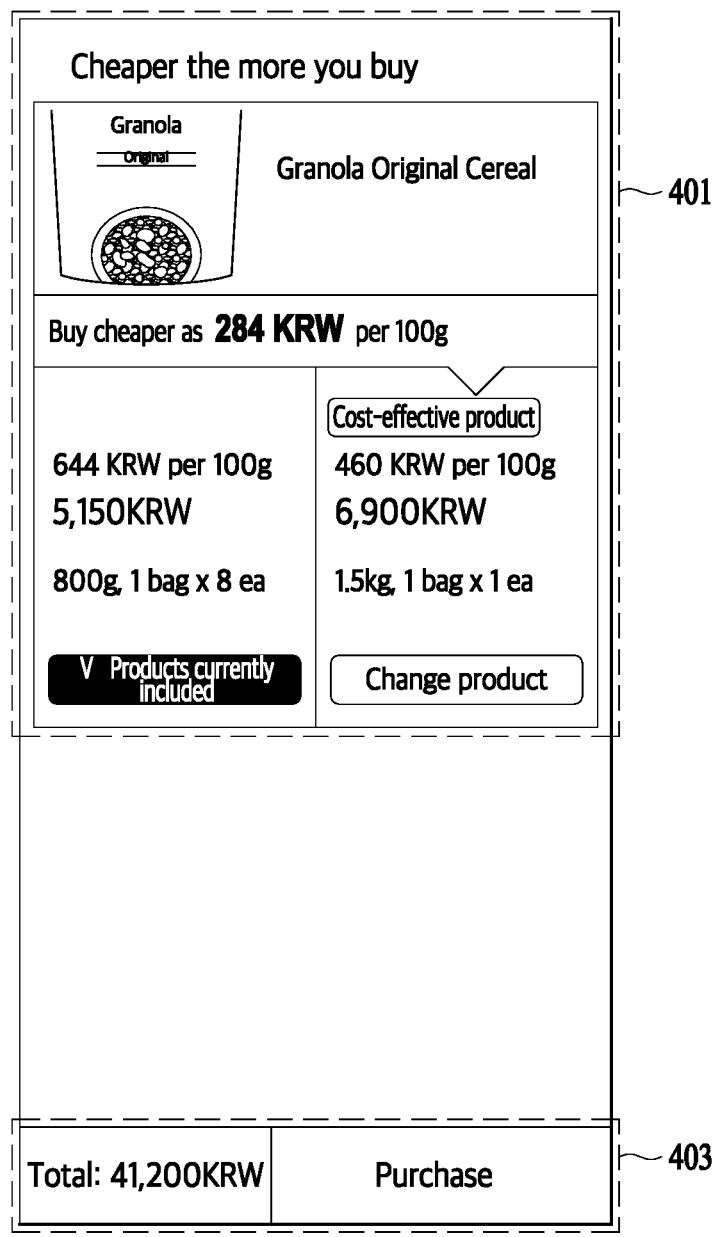
FIG. 4 is a diagram showing an example in which a user device 200 outputs a page including a widget to a user according to various example embodiments.

FIG. 4 is a diagram showing an example in which the user device 200 outputs a page including a widget to a user on the basis of an operation of the server device 100 according to various example embodiments.

Referring to FIG. 4, the user device 200 may output a page having a first widget 401 including unit price information for a plurality of items and a second widget 403 including payment amount information. In FIG. 4, when a user purchases an item "Granola Original Cereal," it can be confirmed that a page including the first widget and the second widget is output by the user device 200 before a payment page is output.

The left part of the first widget discloses that an item "Granola Original Cereal" to be purchased by a user is a first item that is set to be purchased and discloses information on a unit price of the first item, and the right part of the first widget discloses a second item having the same identification information as the item "Granola Original Cereal" to be purchased by the user and discloses information on a unit price of the second item.

Meanwhile, the second widget may include a payment amount to be paid by the user to purchase the first item or the second item and a banner "purchase" for purchasing an item according to the payment amount. The payment amount disclosed at the left part of the second widget may be a payment amount to be paid to purchase the first item that is set by the user. When the user selects the second item on the first widget, the payment amount disclosed at the left part of the second widget may be changed to a payment amount to be paid to purchase the second item. Also, when the user provides an input to the right part of the second widget, the user device 200 may output a page for payment for a selected item. In this case, in 403, the second widget output by the user device 200 may be fixedly displayed at a specific location regardless of scrolling on the page in which the second widget is provided. That is, the second widget may have a fixed display location and may be output and displayed on a lower portion of a screen of the user device 200 that outputs the corresponding page regardless of the user's scrolling.

Figure 5:
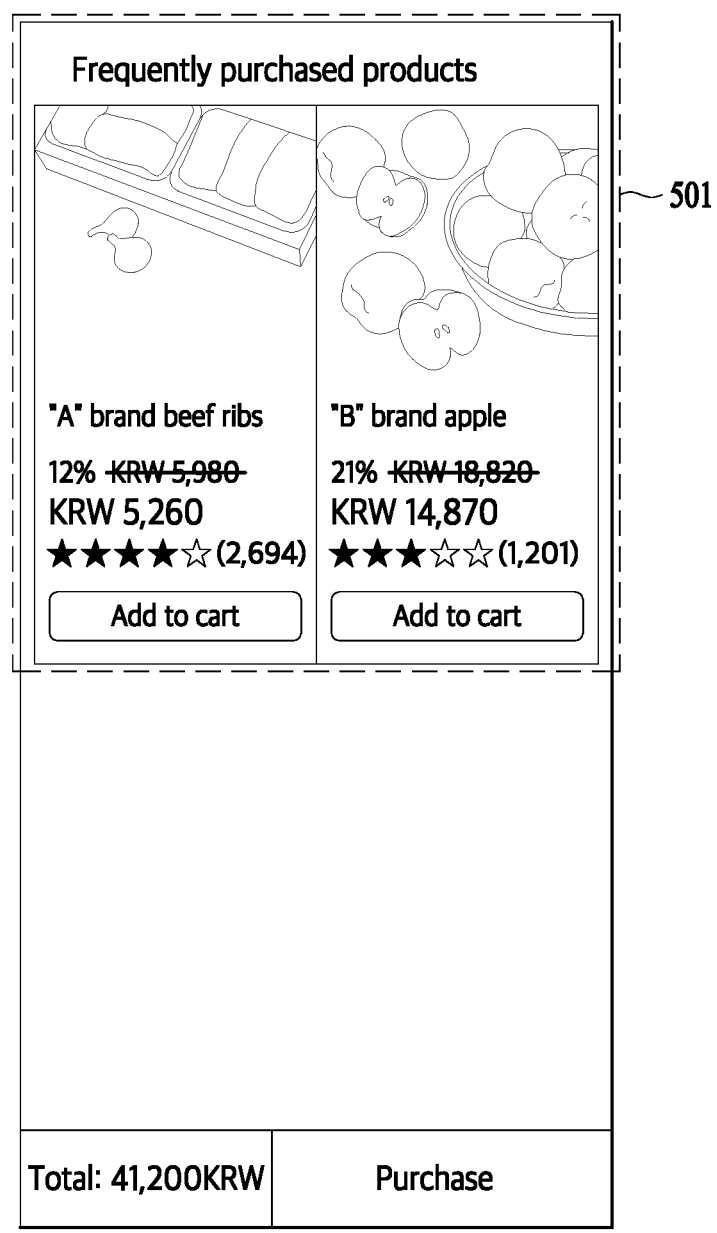
FIG. 5 is a diagram showing another example in which the user device 200 outputs a page including a widget to a user according to various example embodiments.

FIG. 5 is a diagram showing another example in which the user device 200 outputs a page including a widget to a user on the basis of an operation of the server device 100 according to various example embodiments.

Referring to FIG. 5, a page output by the user device 200 may have a third widget 501 including information on an item recommended or confirmed according to a user's purchase history in addition to a first widget including unit price information for a plurality of items and a second widget including payment amount information.

The upper part of the third widget may display the text "frequently purchased product." It can be seen that, in the upper part of the third widget, the relevant widget includes and discloses the information on the item recommended or confirmed according to purchase history of the user and also discloses purchase-related information such as the name, image, or price of the item recommended or confirmed according to purchase history of the user.

In this case, the third widget, which is indicated by reference numeral 501, may correspond to a portion of the page output by the user device 200. Although not shown in FIG. 5, the page output by the user device 200 in FIG. 5 may have the first widget. In addition, it can be seen from FIG. 5 that the second widget is output and displayed on a lower portion of a screen of the user device 200 that outputs the corresponding page regardless of scrolling on the page output by the user device 200.

Figures 6A, 6B, 6C:
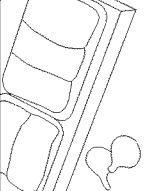
FIGS. 6A, 6B, and 6C are diagrams showing another example in which the user device 200 outputs a page including a widget to a user according to various example embodiments.

FIGS. 6A, 6B and 6C are diagrams showing still another example in which the user device 200 outputs a page including a widget to a user on the basis of an operation of the server device 100 according to various example embodiments.

Referring to FIG. 6A, a page output by the user device 200 may have a fourth widget 601 including information on an item recommended or confirmed according to purchase history of another user related to an item to be purchased by a user in addition to a first widget including unit price information for a plurality of items and a second widget including payment amount information.

The upper part of the fourth widget may display the text "fresh meat." It can be seen that, in the upper part of the fourth widget, the relevant widget includes and discloses the information on the item recommended or confirmed according to purchase history of the user and also discloses purchase-related information such as the name, image, or price of the corresponding item.

Referring to FIG. 6B, a page output by the user device 200 may have a fifth widget 603 including information on an item recommended or confirmed according to when a user's input related to the purchase of an item to be purchased by the user is acquired in addition to a first widget including unit price information for a plurality of items and a second widget including payment amount information.

The upper part of the fifth widget may display the text "seasonal product." It can be seen that, in the upper part of the fifth widget, the relevant widget includes and discloses information on an item having seasonality or a seasonal item, which is in season, on the basis of when the item to be purchased by the user is purchased and also discloses purchase-related information such as the name, image, or price of the corresponding item.

Referring to FIG. 6C, a page output by the user device 200 may have a sixth widget 605 including information on an item recommended or confirmed at a discounted price in addition to a first widget including unit price information for a plurality of items and a second widget including payment amount information.

The upper part of the sixth widget may display the text "special price products." It can be seen that, in the upper part of the sixth widget, the relevant widget includes and discloses information on an item subject to a price discount event or promotion for a certain period of time on the basis when the item to be purchased by the user is purchased and also discloses purchase-related information such as the name, image, or price of the corresponding item. At this time, in some cases, text indicating that the recommended or confirmed item is more suitable for the user, such as "preferred category" or "recommended as additional purchase," may be additionally displayed for the item recommended or confirmed through the sixth widget.

In this case, the fourth to sixth widgets, which are indicated by reference numerals 601 to 605, may correspond to a portion of the page output by the user device 200. Although not shown in FIG. 6A, 6B, or 6C, the page output by the user device 200 in FIGS. 6A, 6B, and 6C may have the first widget. In addition, it can be seen from FIGS. 6A, 6B, and 6C that the second widget is output and displayed on a lower portion of a screen of the user device 200 that outputs the corresponding page regardless of scrolling on the page output by the user device 200.

Figure 7:
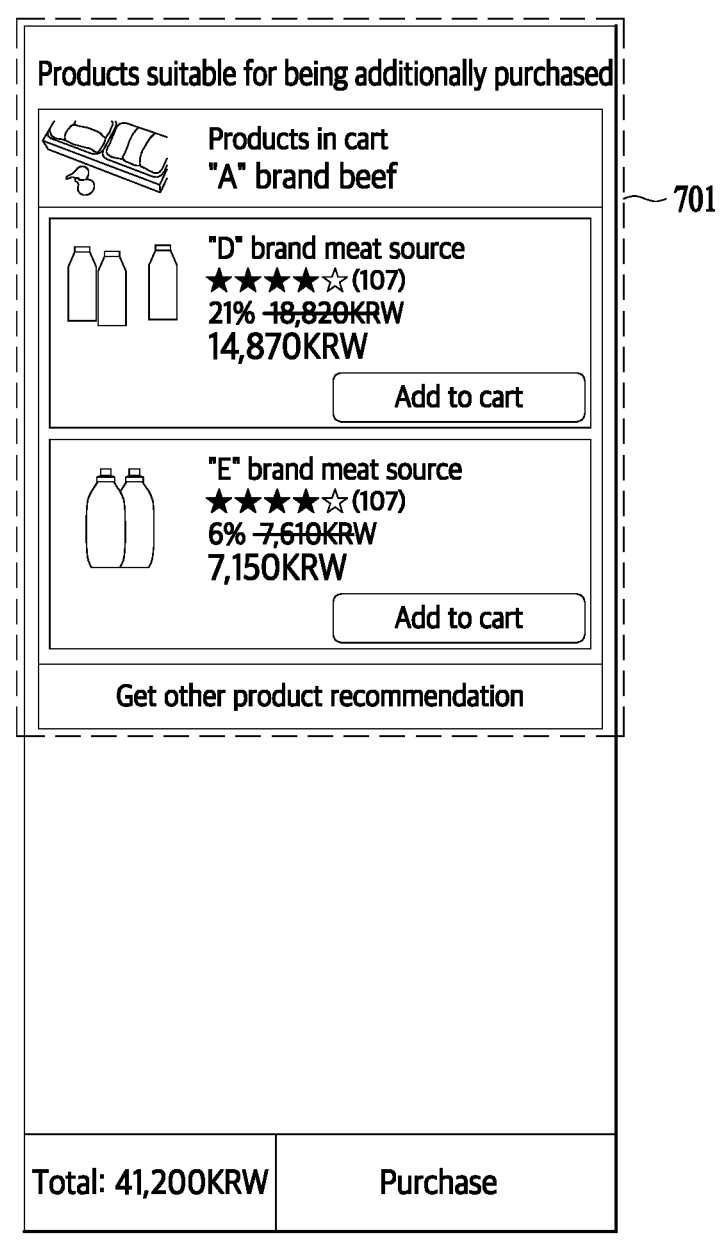

FIG. 7 is a diagram showing yet another example in which the user device 200 outputs a page including a widget to a user on the basis of an operation of the server device 100 according to various example embodiments.

Referring to FIG. 7, a page output by the user device 200 may have a seventh widget 701 including information on an item associated with an item to be purchased by a user in addition to a first widget including unit price information for a plurality of items and a second widget including payment amount information.

The upper part of the seventh widget may display the text "product suitable for being additionally purchased." It can be seen that, in the upper part of the seventh widget, the relevant widget includes and discloses information on an item recommended or confirmed as a product suitable for being purchased together with the first item on the basis of the characteristics of the item to be purchased by the user and also discloses purchase-related information such as the name, image, or price of the corresponding item. Also, the seventh widget may acquire a user's input for recommending or confirming an item associated with the first item other than the item recommended or confirmed through the seventh widget. When the user's input is acquired, the item recommended or confirmed through the seventh widget may be changed and then displayed.

In this case, the seventh widget, which is indicated by reference numeral 701, may correspond to a portion of the page output by the user device 200. Although not shown in FIG. 7, the page output by the user device 200 in FIG. 7 may have the first widget. In addition, it can be seen from FIG. 7 that the second widget is output and displayed on a lower portion of a screen of the user device 200 that outputs the corresponding page regardless of scrolling on the page output by the user device 200.

Figures 8A, 8B:
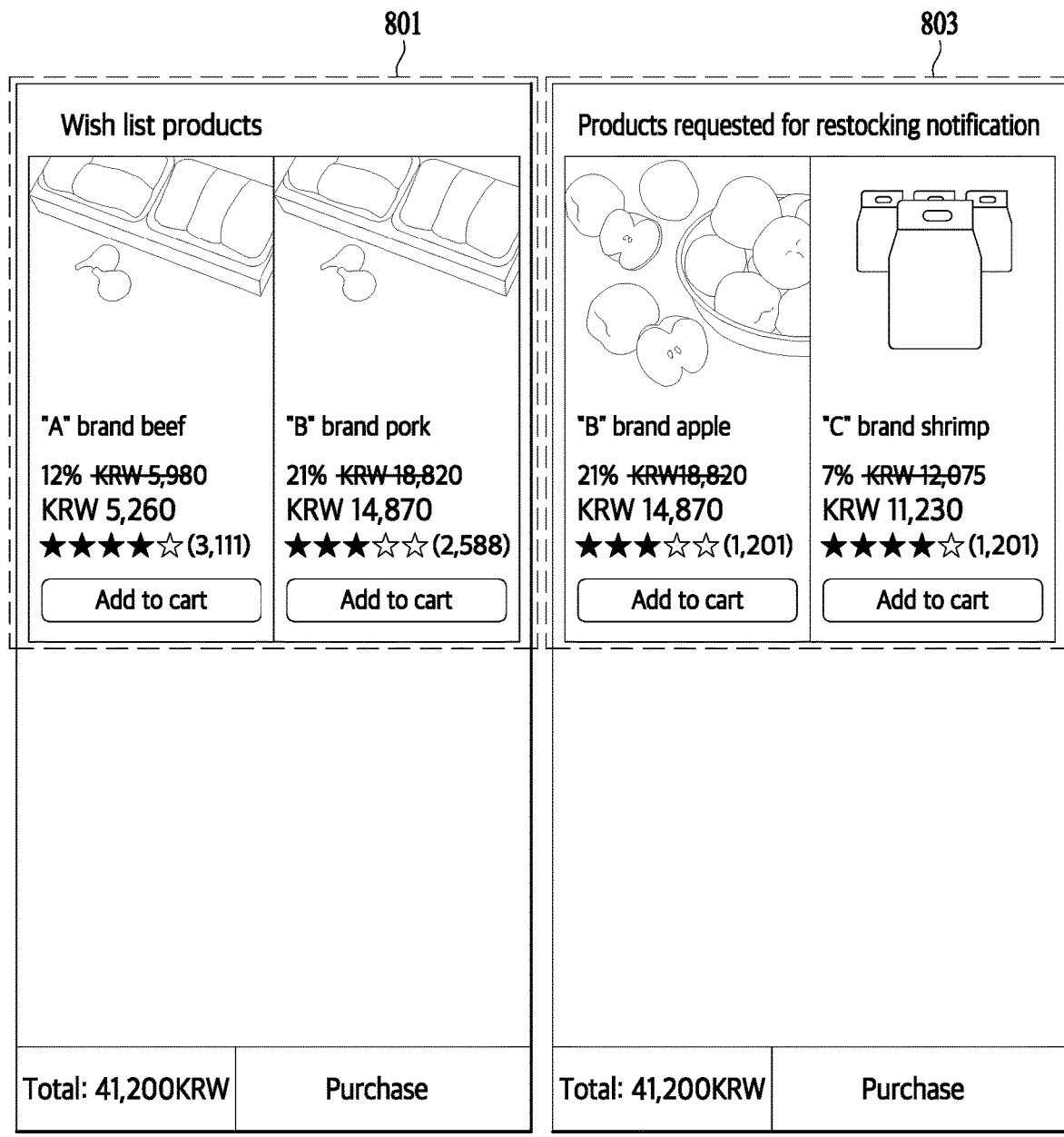
FIGS. 8A and 8B are diagrams showing another example in which the user device 200 outputs a page including a widget to a user according to various example embodiments.

FIGS. 8A and 8B are diagrams showing yet another example in which the user device 200 outputs a page including a widget to a user on the basis of an operation of the server device 100 according to various example embodiments.

Referring to FIG. 8A, a page output by the user device 200 may have an eighth widget 801 including information on an item that is separately added to a purchase schedule list by a user to purchase the item in addition to a first widget including unit price information for a plurality of items and a second widget including payment amount information.

The upper part of the eighth widget, which is indicated by reference numeral 801, may display the text "wish list product." It can be seen that, in the upper part of the eighth widget, the relevant widget includes and discloses the information on the item that is separately added to the purchase schedule list by the user to purchase the item and also discloses purchase-related information such as the name, image, or price of the corresponding item.

Referring to FIG. 8B, a page output by the user device 200 may have an eighth widget 803 including information on an item for which a stock situation is requested by the user to purchase the item and for which information on the corresponding stock situation is confirmed in addition to a first widget including unit price information for a plurality of items and a second widget including payment amount information.

The upper part of the eighth widget, which is indicated by reference numeral 803, may display the text "product requested for restocking notification." It can be seen that, in the upper part of the eighth widget, the relevant widget includes the information on the item for which a stock situation is requested by the user to purchase the item and for which information on the corresponding stock situation is confirmed and also discloses purchase-related information such as the name, image, or price of the corresponding item.

In this case, the eighth widget indicated by reference numerals 801 to 803 may correspond to a portion of the page output by the user device 200. Although not shown in FIG. 8A or 8B, the page output by the user device 200 in FIG. 8 may have the first widget. In addition, it can be seen from FIGS. 8A and 8B that the second widget is output and displayed on a lower portion of a screen of the user device 200 that outputs the corresponding page regardless of scrolling on the page output by the user device 200.

Figures 9A, 9B:
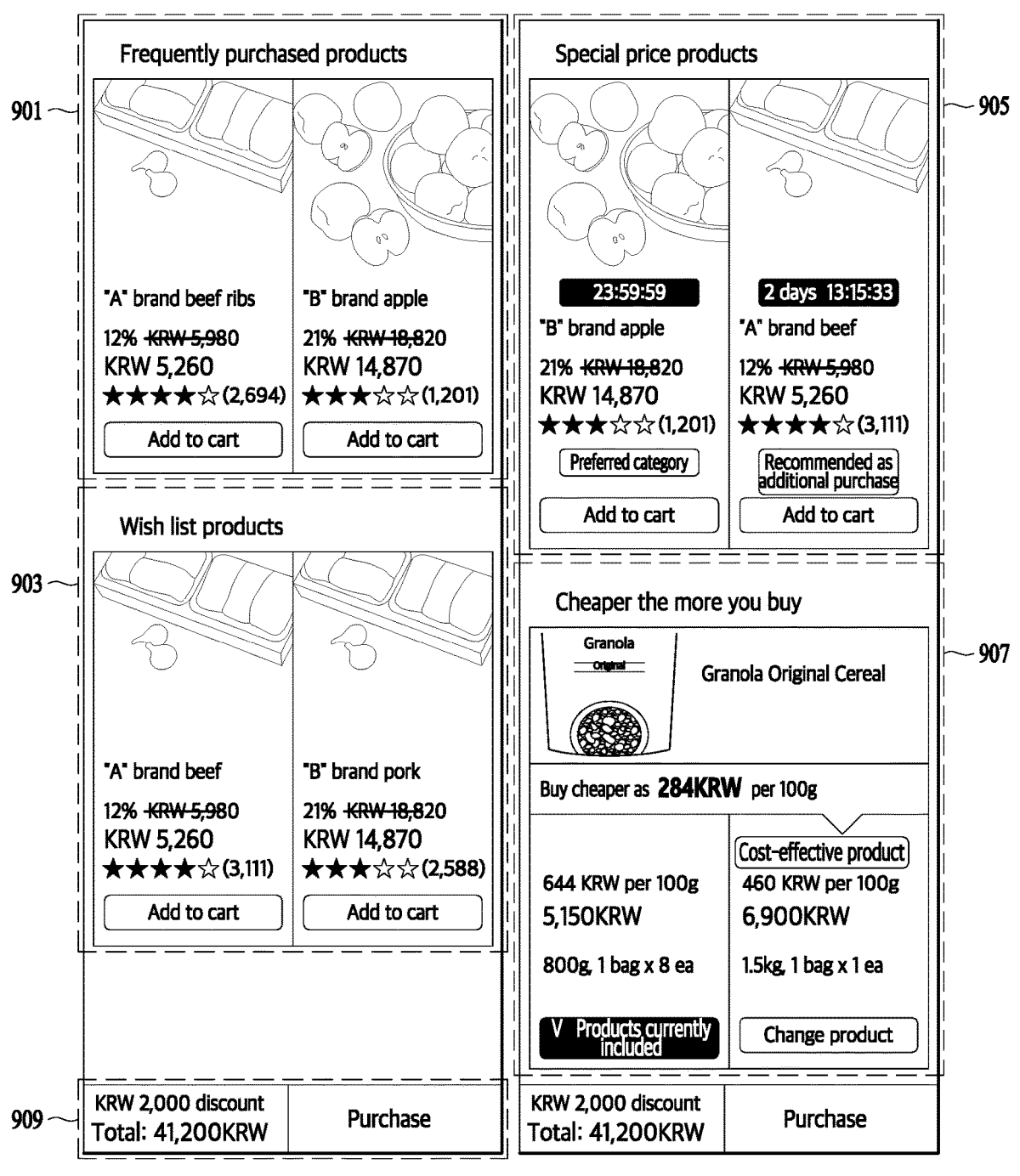

FIGS. 9A and 9B are diagrams showing an example in which a user device 200 outputs a page including various widgets described in example embodiments of FIGS. 4 to 8B to a user in a comprehensive way on the basis of an operation of the server device 100 according to various example embodiments. In this case, the drawings shown in FIGS. 9A and 9B may be for the same page. That is, FIG. 9A may be a drawing corresponding to the upper part of the page output by the user device 200, and FIG. 9B may be a drawing corresponding to the lower part of the page output by the user device 200.

Referring to FIGS. 9A and 9B, a page output by the user device 200 may have a widget 901 including information on an item recommended or confirmed according to a user's purchase history, a widget 903 including information on an item that is separately added to a purchase schedule list by a user to purchase an item, a widget 905 including information on an item recommended or confirmed at a discounted price, or the like in addition to a first widget 907 including unit price information for a plurality of items and a second widget 909 including payment amount information including whether a discount is applied.

The widgets shown in FIGS. 9A and 9B may include the above-described information corresponding to the example embodiments of FIGS. 4 to 8B. In this case, the widgets 901 to 905 may be sequentially displayed from the top of the page output by the user device 200 shown in FIGS. 9A and 9B, and the first widget may be displayed below the widgets 901 to 905. The widgets 901 to 905 that are sequentially displayed from top to down may be displayed on the corresponding page in an order determined according to the numbers of clicks of a plurality of users on the widgets 901 to 905. That is, according to each example embodiment, the display order of the plurality of widgets may be determined based on the number of times other users select each widget, and the display order may be determined based on the total amount of or the number of products purchased through a corresponding widget. Also, the second widget that includes the payment amount information and is for receiving a user's input for an item purchase may be fixedly displayed at a specific location regardless of scrolling of the user in the corresponding page. That is, the second widget may have a fixed display location and may be output and displayed on a lower portion of a screen of the user device 200 that outputs the corresponding page regardless of the user's scrolling.

Figure 10:
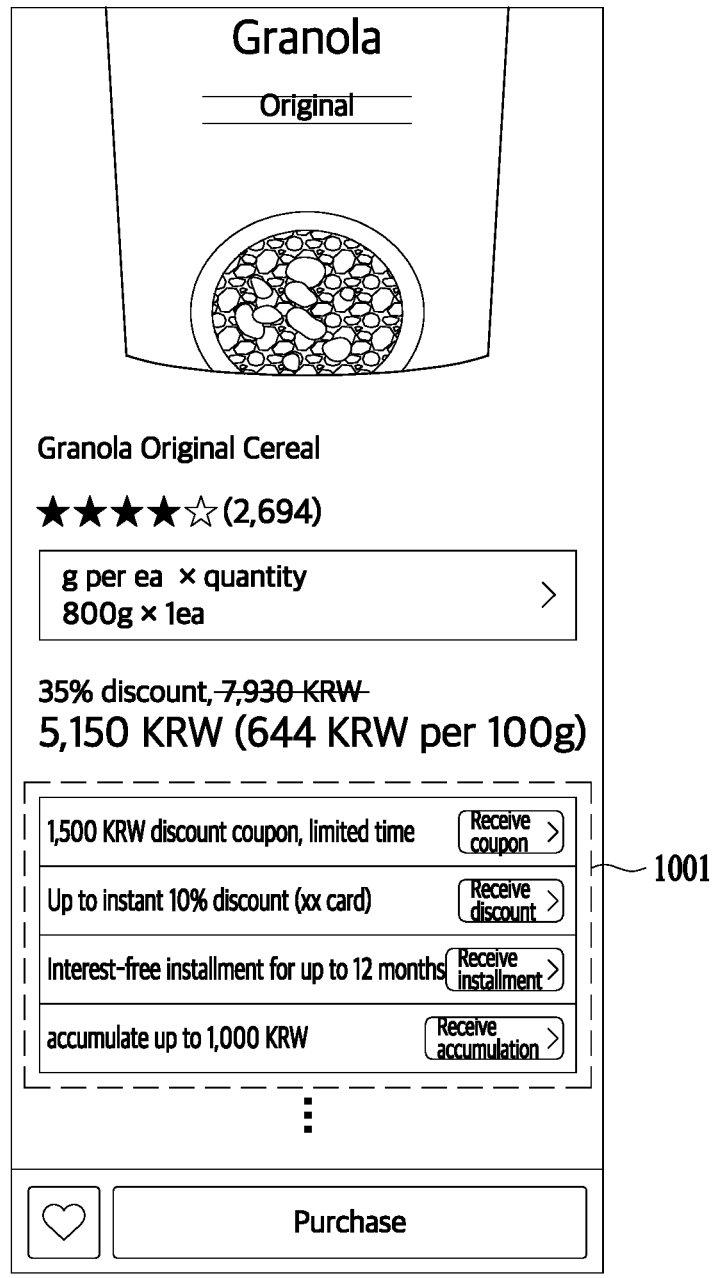
FIG. 10 is a diagram showing an example in which the user device 200 outputs information on a price benefit type to a user according to various example embodiments.

FIG. 10 is a diagram showing an example in which a user device 200 outputs information on a price benefit type to a user on the basis of an operation of the server device 100 according to various example embodiments.

Referring to FIG. 10, the information on the price benefit type output by the user device 200 may be configured in the form of a table with rows indicating price benefit types as indicated by a dashed box 1001. In FIG. 10, the information on the price benefit type output by the user device 200 may include, as a first row and a second row, 1) a type in which a user receives a discount on the sales price through a discount coupon provided by a seller who sells the first item or a business operator who provides a certain service through an electronic apparatus in relation to the sale of the first item and 2) a type in which a user receives a discount on the sales price according to a user's payment method for purchasing the first item. In FIG. 10, also, the information on the price benefit type output by the user device 200 may include, as a third row and a fourth row, 3) a type in which a user receives a benefit of an interest-free installment period according to a user's payment method for purchasing the first item and 4) a type in which a user receives a benefit by receiving a portion of the purchase amount in the form of a refund such as a cashback reward.

Here, the content or configuration of several pieces of information related to the above-described price benefit types is not limited to the above-described content or configuration and may include various other content or configurations that may indicate information related to price benefits for items.

The operation of the user device 200 and the UI/UX for the user device 200 of FIGS. 4 to 10 may be performed in association with the operation of the server device 100 described above in FIG. 3. The UI/UX of FIGS. 4 to 10 is just an example for the disclosure of the present disclosure, and various example embodiments of the present disclosure are not limited to the form of the UI/UX of FIGS. 4 to 10 and may be achieved according to any type of UI/UX that can implement the various example embodiments of the present disclosure.

The example embodiments of the present disclosure disclosed in the present specification and the accompanying drawings have been provided only as specific examples in order to easily describe the technical content of the present disclosure and assist in understanding the present disclosure and do not limit the scope of the present disclosure. That is, it is obvious to those skilled in the art to which the present disclosure pertains that various modifications may be made without departing from the technical spirit of the present disclosure. Also, the above example embodiments may be operated in combination as necessary. For example, all the example embodiments of the present disclosure may be partially combined with each other and implemented by a system.

Also, the method for the system or the like according to the present disclosure may be performed through various computer means and recorded on a computer-readable medium.

As described above, various example embodiments of the present disclosure may be implemented as computer-readable code in a computer-readable recording medium from a specific viewpoint. A computer-readable recording medium is any data storage device capable of storing data that can be read by a computer system. Examples of the computer-readable recording medium may include read-only memory (ROM), random-access memory (RAM), and compact disk-read only memory (CD-ROM), magnetic tapes, floppy disks, optical data storage devices, carrier waves (such as data transmission over the Internet), and the like. The computer-readable recording medium may also be distributed through networked computer systems, and thus computer-readable code is stored and executed in a distributed manner. Also, functional programs, code, and code segments for achieving various example embodiments of the present disclosure may be easily interpreted by programmers skilled in the field to which the present disclosure is applied.

Also, it will be appreciated that the apparatus and method according to various example embodiments of the present disclosure can be implemented in the form of hardware, software, or a combination thereof. Any such software may be stored in, for example, a volatile or non-volatile storage device such as a ROM, a memory such as a RAM, a memory chip, a memory device, or a memory IC, or a storage medium that is optically or magnetically writable and also readable by a machine (e.g., a computer) such as a CD, a DVD, a magnetic disk, or a magnetic tape, regardless of its ability to be erased or its ability to be re-recorded. The method according to various example embodiments of the present disclosure may be implemented by a computer including a controller and a method or a vehicle including such a memory or computer. It can be appreciated that the memory is an example of a machine-readable storage medium that is suitable for storing a program(s) including instructions that implement the example embodiments of the present disclosure.

Accordingly, the present disclosure includes a program for code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Although the above has been described with reference to the example embodiments of the present disclosure, the example embodiments of the present disclosure disclosed in the present specification and the accompanying drawings are only intended to provide specific examples in order to easily describe the technical content of the present disclosure and assist in understanding the present disclosure and are not intended to limit the scope of the present disclosure. Also, it should be understood by those skilled in the art that the above-described example embodiments according to the present disclosure are merely illustrative and various modifications and equivalents can be made without departing from the spirit and scope of the disclosure. Accordingly, the technical scope of the present disclosure should be determined only by the appended claims.

What is claimed is:

1. A method of providing item information on an e-commerce service by an electronic apparatus with displayed widgets arranged by frequency of selection of the widgets by users, the method comprising:
    determining, by a processor of the electronic apparatus, a number of times a plurality of users select, over time, each of the widgets;
    receiving, by the electronic apparatus and from a user device, a first input including selection information of a user acquired from a first page, wherein the first input is associated with a first item;
    identifying, by the processor of the electronic apparatus, whether a second item having identification information corresponding to the first item is present based on information on the first item;
    identifying, by the processor of the electronic apparatus and based on the information on the first item, a plurality of item categories associated with the information on the first item, wherein the plurality of item categories represent categories of items frequently purchased together with a first item category, and wherein the first item is a member of the first item category;
    identifying, by the processor of the electronic apparatus, information on interests and purchase rates of the plurality of users for the plurality of item categories;
    obtaining, from a storage of the electronic apparatus, information on a second item category among the plurality of item categories, based on a priority for high interest and a priority for low purchase; and
    causing, on a display output part of the user device in response to a second input of item purchase and based on identifying that the second item is present, unit price information of the second item is lower than unit price information of the first item, the second item being recommended according to a purchase history of the user, and identifying that the second item was not purchased during a time period before receiving the first input, display of a second page having:
        a first widget including the unit price information of the first item and the unit price information of the second item;
        a second widget including payment amount information; and
        one or more other widgets comprising a third widget including information of a third item included in the second item category and a fourth widget including information on a fourth item identified according to a time point that the second input is acquired,
    wherein the one or more other widgets are automatically arranged on the second page in an order determined based on the number of times the plurality of users select each of the one or more other widgets, and
    wherein the fourth item to be included as information in the fourth widget is determined based on first information on whether the fourth item has seasonality characteristics related to the time point, second information on whether inventory stock of the fourth item is identified on the e-commerce service and third information on whether the fourth item requires certain storage conditions for maintaining freshness.

2. The method of claim 1, wherein the identification information is determined based on an item type.

3. The method of claim 1, further comprising displaying the payment amount information being changed to a price associated with the second item, in response to a third input for selecting the second item through the first widget.

4. The method of claim 1, further comprising providing a third page for payment in response to a third input acquired through the second page.

5. The method of claim 1, wherein the second page further has a fifth widget including information on a fifth item confirmed according to purchase history of another user related to the first item.

6. The method of claim 1, wherein the second page further has a fifth widget including information on a fifth item that a price discount is applied.

7. The method of claim 1, wherein the third item displayed on the third widget is changed based on a third input corresponding to the third widget.

8. The method of claim 1, wherein the second page further has a fifth widget including information on a separate item list designated by the user.

9. The method of claim 1, wherein the second widget is displayed at a fixed location regardless of scrolling of the user in the second page.

10. The method of claim 1, wherein the payment amount information included in the second widget includes a price to which a discount is applied based on information of the user and the information on the first item.

11. The method of claim 10, wherein the information on the first item includes information on one or more price benefit types for the first item,
    the information on the one or more price benefit types is configured as a table including the one or more price benefit types, and
    the discounted price is determined based on whether one or more price benefits are applied to the user.

12. An electronic apparatus for providing item information on an e-commerce service, the electronic apparatus comprising:
    a processor;
    storage; and
    one or more memories configured to store one or more instructions,
    wherein when executed, the one or more instructions control the processor to perform operations of:
        determining, by the processor, a number of times a plurality of users select, over time, each of a plurality of widgets;
        receiving, from a user device, a first input including selection information of a user acquired from a first page, wherein the first input is associated with a first item;
        identifying, by the processor, whether a second item having identification information corresponding to the first item is present based on information on the first item;
        identifying, by the processor and based on the information on the first item, a plurality of item categories associated with the information on the first item, wherein the plurality of item categories represent categories of items frequently purchased together with a first item category, and wherein the first item is a member of the first item category;

identifying, by the processor, information on interests and purchase rates of the plurality of users for the plurality of item categories;

obtaining, from the storage, information on a second item category among the plurality of item categories, based on a priority for high interest and a priority for low purchase; and causing, on a display output part of the user device in response to a second input of item purchase and based on identifying that the second item is present, unit price information of the second item is lower than unit price information of the first item, the second item being recommended according to a purchase history of the user, and identifying that the second item was not purchased during a time period before receiving the first input, display of a second page having:

a first widget including the unit price information of the first item and the unit price information of the second item;

a second widget including payment amount information; and one or more other widgets comprising a third widget including information of a third item included in the second item category and a fourth widget including information on a fourth item identified according to a time point that the second input is acquired, wherein the one or more other widgets are automatically arranged on the second page in an order determined based on the number of times the plurality of users select each of the one or more other widgets, and wherein the fourth item to be included as information in the fourth widget is determined based on first information on whether the fourth item has seasonality characteristics related to the time point, second information on whether inventory stock of the fourth item is identified on the e-commerce service and third information on whether the fourth item requires certain storage conditions for maintaining freshness.

13. A user device for outputting item information on an e-commerce service, the user device comprising:

a processor; and one or more memories configured to store one or more instructions, wherein when executed, the one or more instructions control the processor to perform operations of:

determining, by the processor, a number of times a plurality of users select, over time, each of a plurality of widgets;

transmitting, to a server device, a first input including selection information of a user acquired from a first page;

receiving, from the server device, information on a first item based on the first input;

transmitting, to the server device, a second input for item purchase;

receiving, from the server device in response to the second input and based on identifying a second item is present, wherein the second item has identification information corresponding to the first item, unit price information of the second item being lower than unit price information of the first item, the second item being recommended according to a purchase history of the user, and identifying that the second item was not purchased during a time period before receiving the first input, a second page having:

a first widget including the unit price information of the first item and the unit price information of the second item;

a second widget including payment amount information; and one or more other widgets comprising a third widget including information of a third item included in a second item category and a fourth widget including information on a fourth item identified according to a time point that the second input is acquired, wherein the second item category is determined to be corresponding to a first item category including the first item; and outputting the second page, wherein a plurality of item categories, determined according to a frequency for being purchased together with the first item category, are identified based on the information on the first item, wherein information on interests and purchase rates of the plurality of users for the plurality of item categories is identified, wherein the second item category is determined among the plurality of item categories based on a priority for high interest and a priority for low purchase, wherein the one or more other widgets are automatically arranged on the second page in an order determined based on the number of times the plurality of users selected each of the one or more other widgets, and wherein the fourth item to be included as information in the fourth widget is determined based on first information on whether the fourth item has seasonality characteristics related to the time point, second information on whether inventory stock of the fourth item is identified on the e-commerce service and third information on whether the fourth item requires certain storage conditions for maintaining freshness.

* * * * *